(12) United States Patent
Kitaura et al.

(10) Patent No.: US 6,443,279 B1
(45) Date of Patent: Sep. 3, 2002

(54) CLUTCH-BRAKE DEVICE FOR A MECHANICAL PRESS

(75) Inventors: Ichiro Kitaura; Kouryu Ro, both of Itami (JP)

(73) Assignee: Pascal Kabushiki Kaisha, Itami (JP)

( * ) Notice: Subject to any disclaimer, the term of this patent is extended or adjusted under 35 U.S.C. 154(b) by 0 days.

(21) Appl. No.: 09/693,236

(22) Filed: Oct. 20, 2000

Related U.S. Application Data

(63) Continuation of application No. PCT/JP99/00802, filed on Feb. 22, 1999.

(51) Int. Cl.[7] ............................................... F16D 67/04
(52) U.S. Cl. .............. 192/18 A; 192/70.12; 192/85 CA
(58) Field of Search ............................. 192/18 A, 12 C, 192/70.12, 85 CA, 113.34

(56) References Cited

U.S. PATENT DOCUMENTS

| | | | | |
|---|---|---|---|---|
| 4,135,611 A | * | 1/1979 | Spanke | 192/18 A |
| 4,785,926 A | * | 11/1988 | Matson | 192/18 A |

FOREIGN PATENT DOCUMENTS

| | | | |
|---|---|---|---|
| JP | 7-51898 A | * | 2/1995 |
| JP | 10-305399 A | * | 11/1998 |

* cited by examiner

*Primary Examiner*—Richard M. Lorence
(74) *Attorney, Agent, or Firm*—Darby & Darby

(57) ABSTRACT

A clutch-brake device is provided on a driving force delivery system delivering a driving force, inputted to a fly wheel of a mechanical press, to a crank shaft. A stationary member rotationally supports the fly wheel. A rotation shaft has at least one part rotationally supported by the stationary member and transfers the driving force to the crank shaft. A multi-disk clutch is provided between a case member affixed to the fly wheel and a rotation input part of the rotation shaft. A multi-disk brake is provided between the stationary member and the rotation input part of the rotation shaft. A fluid pressure cylinder rotates as a unit with the fly wheel and switching the multi-disk clutch and the multi-disk brake. An output part, on the piston member of the fluid pressure cylinder, delivers the pushing force of the piston member to a clutch plate which rotates as a unit with the case member. The clutch-brake device prevents abrasion of the piston member and the like, increases durability, reduces manufacturing costs, and prevents looseness of the piston member.

11 Claims, 3 Drawing Sheets

CLUTCH-BRAKE DEVICE FOR A MECHANICAL PRESS

This application is a continuation of PCT/JP99/00802 filed Feb. 22, 1999.

BACKGROUND TO THE INVENTION

The present invention relates to a clutch-brake device for a mechanical press. More specifically, the present invention relates to a clutch-brake device that is constructed so that the pushing force of a piston member of a fluid pressure cylinder is directly delivered to a clutch plate which rotates as a unit with a case member.

A conventional clutch-brake device of a mechanical press has a driving force delivery system, wherein the driving force inputted to the fly wheel is delivered to the crank shaft. The clutch-brake device is fundamentally constructed from the following: a stationary member, rotationally supports a fly wheel; a rotation shaft, rotationally supported by the stationary member; a case member, affixed to the fly wheel; a rotation input member, affixed to the rotation shaft; a multiple disk clutch, between the case member and the rotation input member; a multiple disk brake, between the stationary member and the rotation input member; a fluid pressure cylinder, rigidly provided on the case member switching the multi-disk clutch and the multi-disk brake.

With this type of clutch-brake device, when the multi-disk clutch is switched to the connected state by the fluid pressure cylinder, the multi-disk brake is switched to a disconnected state. In this state, the driving force inputted to the fly wheel is delivered to the crank shaft via the case member, the multi-disk clutch, the rotation input member, the rotation shaft, and the like. When the multi-disk clutch is switched to the disconnected state, the multi-disk brake is switched to the connected state, and the rotation shaft which is rotating is braked.

In order to couple the switchings of the multi-disk clutch and the multi-disk brake, the clutch-brake device of the mechanical press of Japanese Laid-Open Patent Publication Number 7-51898 has a hub, acting as a rotation input member, rigidly fitted outside the rotation shaft. On both ends in the axial direction, the hub is provided with a clutch push plate, which is opposite the multi-disk clutch, and a brake push plate, which is opposite the multi-disk brake. The clutch push plate and the brake push plate are both joined to the hub by a spline, thereby rotating as a unit with the hub. The clutch push plate and brake push plate are linked by a plurality of bolts which pass through the hub, thereby moving as a unit in the axial direction.

When the fluid pressure cylinder is driven, the multi-disk clutch is pushed by the piston member via the clutch push plate and switched to the connected state. Then, the brake push plate is moved in the direction separating from the multi-disk brake. The multi-disk brake is no longer being pushed by the brake push plate, and it is switched to a disconnected state. When the fluid pressure of the fluid pressure cylinder is released, the multi-disk brake, via the brake push plate, is switched to the connected state by a plurality of brake springs, which are housed inside the hub. Then, the clutch push plate moves as a unit with the piston member in the direction separating from the multi-disk clutch. The multi-disk clutch is no longer being pushed by the clutch push plate, and it is switched to the disconnected state.

However, with the conventional clutch-brake device for a mechanical press of Japanese Laid Open Patent Number 7-51898, the piston member of the fluid pressure cylinder rotates as a unit with the fly wheel, and the clutch push plate rotates as a unit with the rotation shaft. As a result, when switching the multi-disk clutch between the connected and disconnected states, there is slipping caused by the difference in rotation speeds between the piston member and the clutch push plate, resulting in abrasion of the piston member and the clutch push plate, thereby reducing durability.

With the above clutch-brake device, the clutch push plate is provided between the multi-disk clutch and the piston member. By pushing this clutch push plate, the multi-disk clutch is connected. As a result, when there is abrasion in the clutch push plate or piston member, the efficiency of delivery of the pushing pressure of the piston member to the multi-disk clutch is reduced. In addition, the device becomes larger in the axial direction by the amount of the thickness of the clutch push plate, and manufacturing costs increase. When the multi-disk clutch is disconnected, the movement of the piston member of the fluid pressure cylinder is not restricted. As a result, there is looseness in the piston member.

OBJECTS AND SUMMARY OF THE PRESENT INVENTION

It is an object of the present invention to provide a clutch-brake device for a mechanical press which overcomes the foregoing problems.

More specifically, it is an object of the present invention is to provide a clutch-brake device for a mechanical press, wherein abrasion of the piston member and the like is prevented, durability is heightened, manufacturing costs are reduced, and looseness of the piston member is prevented.

The present invention is a clutch-brake device, provided on a driving force delivery system delivering driving force, which is inputted to a fly wheel of a mechanical press, to a crank shaft, comprising a stationary member, rotationally supports the fly wheel; a rotation shaft, having at least one part rotationally supported by the stationary member and transferring the driving force to the crank shaft; a multi-disk clutch, provided between a case member affixed to the fly wheel and a rotation input part of the rotation shaft; a multi-disk brake, provided between the stationary member and the rotation input part of the rotation shaft; a fluid pressure cylinder, rotating as a unit with the fly wheel and switching the multi-disk clutch and the multi-disk brake; and an output part, on the piston member of the fluid pressure. cylinder and delivering the pushing force of the piston member to a clutch plate which rotates as a unit with the case member.

The pushing force of the piston member of the fluid pressure cylinder is delivered to the clutch plate via the output part, switching the multi-disk clutch to the connected state. In this connected state, the driving force inputted to the fly wheel is delivered to the crank shaft via the case member, the multi-disk clutch, the rotation input part, and the rotation shaft. Coupled with the switching of the multi-disk clutch to the connected state, the multi-disk brake switches to the disconnected state. Coupled with the switching of the clutch plate to the disconnected state, the multi-disk brake is switched to the connected state, and the rotation shaft is braked.

In this clutch-brake device, the piston member of the fluid pressure cylinder rotates as a unit with the fly wheel and case member. The clutch plate rotates as a unit with the case member and fly wheel. As a result, when directly pushing the clutch plate with the output part of the piston member, a rotation speed difference does not arise between the output part and the clutch plate. There is no abrasion of the piston member or clutch plate, and the durability of the multi-disk clutch and piston member is dramatically improved. In addition, because the pushing force of the piston member is directly delivered to the multi-disk clutch, the multi-disk clutch can be made smaller in the axial direction, thereby reducing manufacturing costs.

According to a preferred embodiment of the present invention, the clutch-brake device also has the following: an annular member, opposite the piston member of the fluid pressure cylinder with a small gap therebetween, rotatably movable in an axial direction and rotating as a unit with the rotation shaft; a brake-side annular member, near and opposite the multi-disk brake; a plurality of bolts, connecting the brake-side annular member to the annular member; and a thrust bearing, between the piston member and the annular member.

When switching the multi-disk clutch to the connected state, the annular member is pushed and moved by the piston member of the fluid pressure cylinder via the thrust bearing. Due to this annular member, the brake-side annular member, via a plurality of bolts, moves toward the disconnect side, and the multi-disk brake switches to the disconnected state. In other words, even if there is a rotation speed difference between the annular member, which rotates as a unit with the rotation shaft, and the piston member, which rotates as a unit with the fly wheel, this rotation speed difference is absorbed by the thrust bearing. As a result, abrasion of the annular member and the piston member is prevented, and durability is heightened.

It is preferable to have a plurality of brake springs, which elastically impel the brake-side annular member and the annular member toward the piston member, bringing the multi-disk brake to the braking state (connected state). In this situation, when the fluid pressure of the fluid pressure cylinder is released, due to the elastic impelling force of the plurality of brake springs, the multi-disk brake is pushed by the brake-side annular member and is switched to the braking state. In addition, the output part of the piston member is moved in a direction away from the clutch plate via the brake side annular member, plurality of bolts, and annular member, and the multi-disk clutch is switched to the disconnected state.

It is preferable to have the above brake-side annular member be near and opposite the brake disk, which rotates as a unit with the rotation input part of the rotation shaft. When switching the multi-disk brake to the braking state, the brake-side annular member contacts the brake disk, but because the brake-side annular member and the brake disk both rotate as a unit with the rotation shaft, there is no slippage resulting from rotation speed differences between the brake-side annular member and the brake disk. As a result, their abrasion is prevented, and durability is heightened.

It is preferable to provide a compression spring, which elastically impels the above piston member toward the annular member. The elastic impelling force of the compression spring assures that the piston member is always pushed against the thrust bearing. As a result, looseness in the thrust bearing or piston member is prevented. Furthermore, the elastic impelling force by the compression spring is set to be smaller than the elastic impelling force of the plurality of brake springs.

The above driving force delivery system has a gear member, affixed to the rotation shaft, which engages with a gear affixed to the crank shaft. It preferably is provided with a support part, which rotationally supports, via a bearing, a part of the rotation shaft that is on the opposite side as the stationary member with respect to the gear member. The rotation shaft can be supported on both sides of the gear member by the stationary member side and this support part. As a result, sagging of the rotation shaft is suppressed, and a smooth engagement of the gear member and the gear on the crank shaft side is maintained.

The above driving force delivery system has a gear member, affixed to the rotation shaft, which engages with a gear affixed the crank shaft. The support part, which rotationally supports, via a bearing, a part of the rotation shaft on the stationary member side with respect to the gear member. In this situation, on the rotation shaft, a large space near the gear on the crank shaft side is maintained. As a result, this is advantageous in terms of machinery layout.

The above rotation input part can be constructed as a rotation input member which is joined by a spline to the rotation shaft so that movement in the axial direction is not possible. In this situation, the parts of the rotation shaft, other than the rotation input part, can be made smaller, and the manufacturing costs for the rotation shaft is reduced further.

Furthermore, when placing the above plurality of bolts so that they pass through the rotation input part, the space for placing these plurality of bolts can be made smaller. and the size of the clutch-brake device is reduced further.

Preferably, an oil housing part, which houses oil for the multi-disk clutch and multi-disk brake, is provided in the area surrounded by the stationary member, the fly wheel, the case member, and the piston member of the fluid pressure cylinder. Preferably, a plurality of oil passages, for oil circulation and which is in the radial direction, are formed at certain intervals in the circumferential direction on the ring-shaped output part of the piston member.

The multi-disk clutch and the multi-disk brake can be cooled by the oil inside the oil housing part. The other sliding parts can be lubricated by the oil. Furthermore, the circulation of oil can be facilitated by the plurality of oil passages in the output part.

When a plurality of spring housing parts, housing the plurality of brake springs, is formed in the interior of the above rotation input part, this is advantageous in terms of the space for arranging the plurality of brake springs. The clutch-brake device can be made smaller.

When having a compression spring between the head-side case member and the piston member of the fluid pressure cylinder, the piston member is reliably impelled elastically in the direction of the annular member by this compression spring. Because the compression spring is built into the inside of the fluid pressure cylinder, the clutch-brake device is therefore made smaller.

The above, and other objects, features, and advantages of the present invention will become apparent from the following description read in conjunction with the accompanying drawings, in which like reference numerals designate the same elements.

DETAILED DESCRIPTION OF THE INVENTION

Referring to the figures, the embodiments of the present invention will be described below.

The present invention is directed to a clutch-brake device provided on a driving force delivery system, delivering the driving force, which is inputted to a fly wheel of a mechanical press, to a crank shaft. It should be noted that descriptions of right and left throughout this specification indicate the right and left as depicted in FIG. 1.

Figure 1:
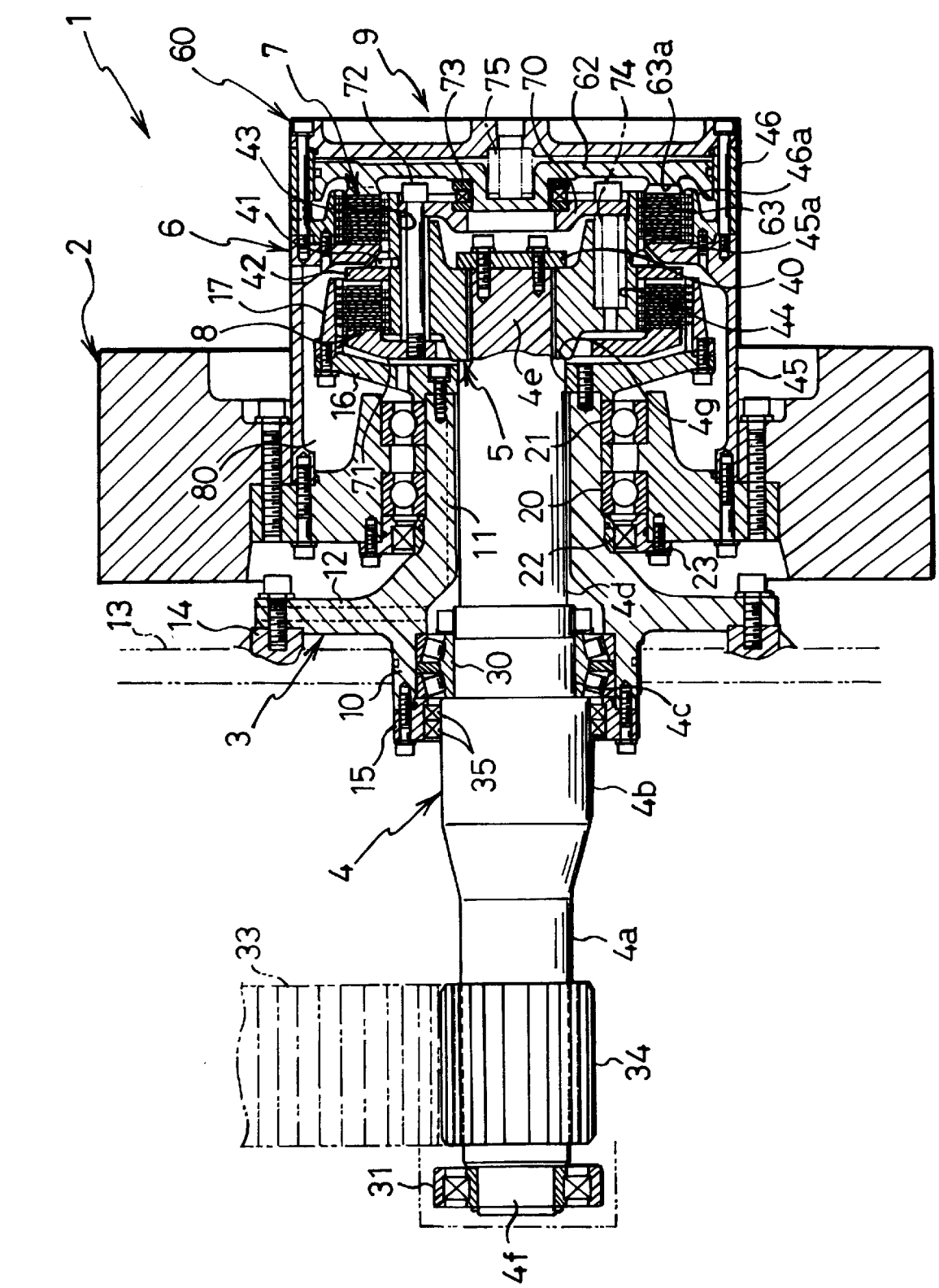
FIG. 1 is a vertical cross-section of the clutch-brake device of an embodiment of the present invention.
Figure 2:
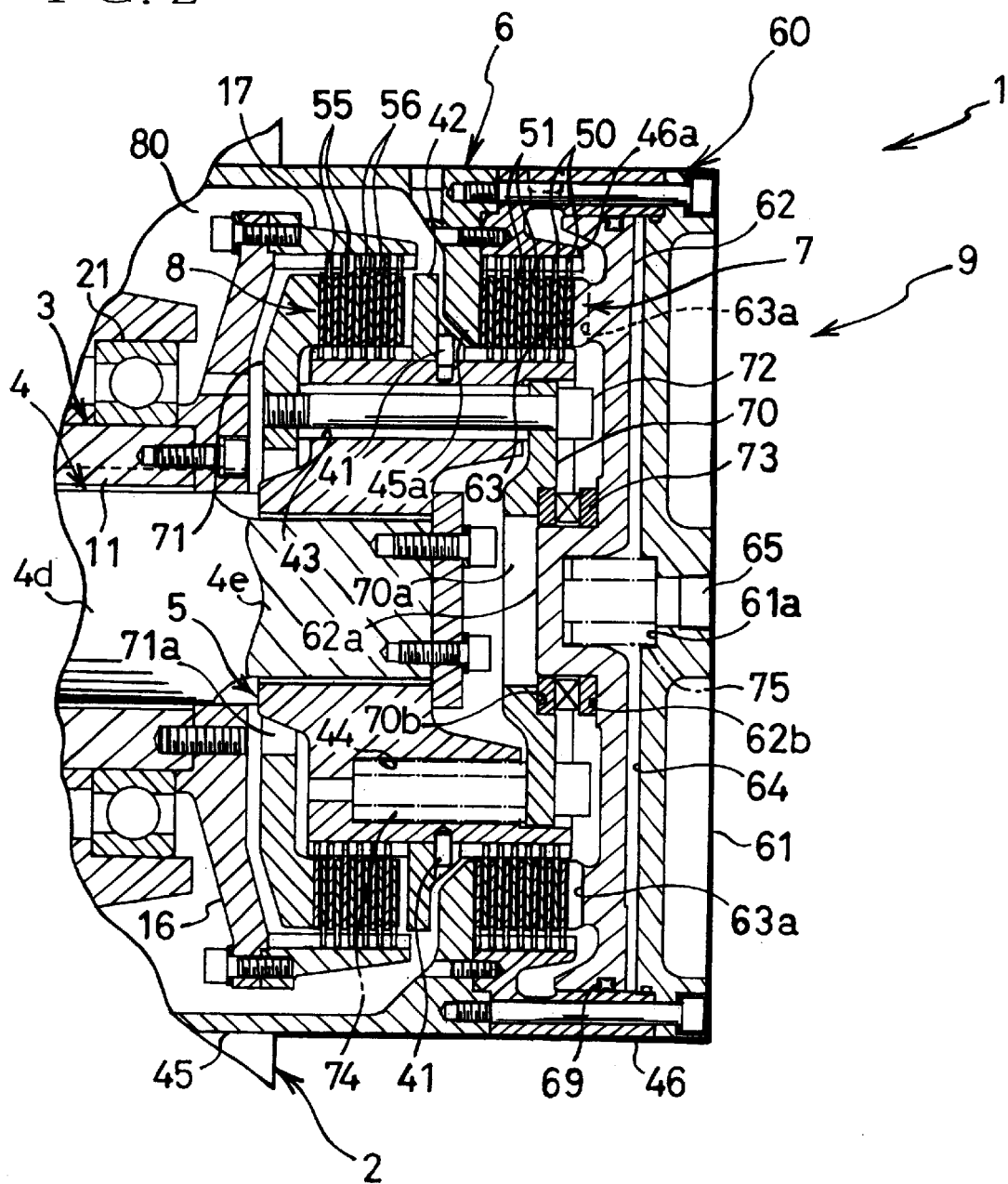
FIG. 2 is a vertical cross-section of the essentials of the clutch-brake device with the clutch in the connected state and the brake in the disconnected state.
Figure 3:
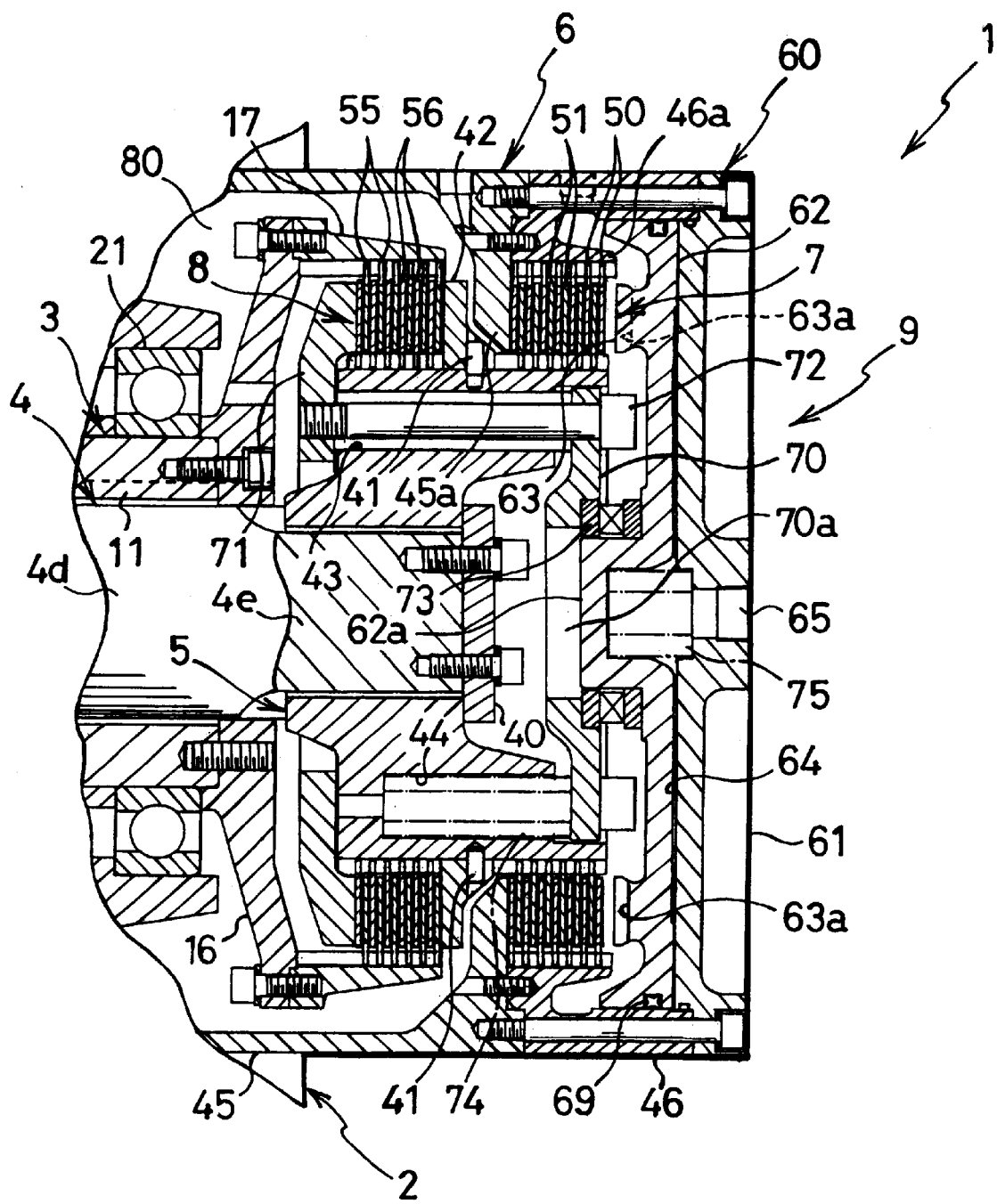
FIG. 3 is a vertical cross-section of the essentials of the clutch-brake device with the clutch in the disconnected state and the brake in the connected state.

Referring to FIGS. 1 through 3, a clutch-brake device 1 of a mechanical press is constructed from a stationary member 3 rotationally supporting a fly wheel 2. A rotation shaft 4 has a support shaft part 4c rotationally supported on stationary member 3. A rotation input member 5 is rigidly fitted outside an input shaft part 4e on the right end portion of rotation shaft 4. A tubular case member 6, affixed on fly wheel 2, extends towards the right. A multi-disk clutch 7 is provided between case member 6 and rotation input member 5. A multi-disk brake 8 is provided between stationary member 3 and rotation input member 5. A switching mechanism 9, includes an air cylinder 60, which rotates as a unit with fly wheel 2, and switches multi-disk clutch 7 and multi-disk brake 8.

Stationary member 3 is constructed by the unitary formation of the following: a large tube part 10; a small tube part 11, which is positioned to the right of large tube part 10; and a rim part 12, which is positioned on the outer edge near the boundary area of large tube part 10 and small tube part 11. The outer perimeter part of rim part 12 is joined by bolts to a ring-shaped joining part 14 of press body 13, which is positioned to the left of rim part 12. Stationary member 3 includes a stationary ring member 15 which is joined by bolts to the left end of large tube part 10; a stationary plate member 16 which is joined by bolts to the right end of small tube part 11; and a stationary tube member 17 which is joined by bolts to a part near the outer perimeter of the right end of stationary plate member 16 and extends towards the right. Multi-disk brake 8 is provided between stationary tube member 17 and the left part of rotation input member 5.

Fly wheel 2 is rotationally supported by fitting on the outside of small tube part 11 of stationary member 3 via a pair of left and right radial bearings 20 and 21. A ring member 23, which includes an annular seal 22 which seals between fly wheel 2 and small tube part 11 of stationary member 3, is joined by bolts to the left end of fly wheel 2. Ring member 23 and bearings 20 and 21 and the like are sandwiched between rim part 12 and stationary plate member 16 of stationary member 3, thereby preventing fly wheel 2 from moving in the left-right direction.

Rotation shaft 4, passing through tube parts 10 and 11 of stationary member 3, extends to both the right and left. Starting from the left, rotation shaft 4 is constructed from a unitary formation from output shaft part 4a, large shaft part 4b, support shaft part 4c, inserted shaft part 4d, and input shaft part 4e. Support shaft part 4c of rotation shaft 4 is rotationally supported by fitting inside large tube part 10 of stationary member 3 via two rows of tapered roller bearings 30. Of rotation shaft 4, support shaft part 4f, which is positioned on the left side of output shaft part 4a, is rotationally supported, via a radial bearing 31, by a support part formed on press body 13. A gear member 34, engaging with a gear 33 affixed to the crank shaft (not shown), is externally fitted and affixed on output shaft part 4a of rotation shaft 4. A pair of annular seals 35 is provided between large shaft part 4b and stationary ring member 15.

Rotation input member 5, which acts as the rotation input part for rotation shaft 4, is joined by a spline in a mutual non-rotating manner to input shaft part 4e, which has a smaller diameter than inserted shaft part 4d of rotation shaft 4. A latch plate 40, which has a larger diameter than input shaft part 4e, is joined by bolts to the right end surface of input shaft part 4e. Rotation input member 5 is sandwiched and latched between a latching part 4g, which is near the outer perimeter on the right end of inserted shaft part 4d, and latching plate 40. Rotation input member 5 cannot move in the right-left direction. In the perimeter portion of the center part in the right-left direction of rotation input member 5, a plurality of pins 41 are inserted and affixed in the radial direction. A ring-shaped receiving member 42 is fitteded externally on rotation input member 5 on the left side of pins 41. A plurality of bolt holes 43, which are opened on both ends in the right-left direction, and a plurality of spring housing holes 44, which are opened on the right end, are formed on rotation input member 5.

Case member 6 includes a first case 45 which is joined by bolts to fly wheel 2 and extends towards the right. A second case 46 is joined by bolts to the right end of first case 45 and extends towards the right. A head-side case member 61 will be described later. A ring-shaped receiving part 45a, which protrudes axially, is formed in a unitary manner on the right end of first case 45. A tube part 46a, which contacts receiving part 45a and protrudes axially, is formed in a unitary manner on the left end of second case 46. A multi-disk clutch 7 is provided between this tube part 46a and the right part of rotation input member 5.

Referring now to FIGS. 2 and 3, multi-disk clutch 7 includes a plurality (seven, for example) of clutch plates 50 joined by a spline to fit inside tube part 46a of case member 6. A plurality (six, for example) of clutch disks 51 are joined by a spline to fit externally onto the right half part of rotation input member 5. Clutch plates 50 and clutch disks 51 are arranged in an alternating manner. Clutch plates 50 are positioned on both right and left ends of multi-disk clutch 7. Clutch plates 50 are opposite receiving part 45a of case member 6 and output part 63, which is formed unitarily on piston member 62 of air cylinder 60.

Multi-disk clutch 7 is pushed by output part 63 of piston member 62. Multi-disk clutch 7 is sandwiched between output part 63 and receiving part 45a of case member 6 to achieve a connected state (refer to FIG. 2). The driving force of case member 6 can be delivered to rotation input member 5. On the other hand, if multi-disk clutch 7 is not pushed by output part 63 of piston member 62, it becomes a disconnected state (refer to FIG. 3), and the driving force of case member 6 cannot be delivered to rotation input member 5.

Multi-disk brake 8 includes a plurality (six, for example) of brake plates 55 joined by a spline to fit inside stationary tube member 17. A plurality (six, for example) of brake disks 56 are joined by a spline to fit externally on the left half of rotation input member 5. Brake plates 55 and brake disks 56 are arranged in an alternating manner. Brake disk 56 is positioned at the left end of multi-disk brake 8 and is opposite brake-side annular member 71. Brake plate 55 is positioned on the right end of multi-disk brake 8 and is opposite receiving member 42.

Multi-disk brake 8, pushed by brake-side annular member 71, is sandwiched between brake-side annular member 71 and receiving member 42, to achieve a connected state (braking state) (refer to FIG. 3). When this occurs, while rotating, rotation input member 5, or in other words rotation shaft 4, is braked. On the other hand, when multi-disk brake 8 is not pushed by brake-side annular member 71 and is in a disconnected state (refer to FIG. 2), the rotating rotation shaft 4 is not braked.

Switching mechanism 9 will be described.

Switching mechanism 9 couples the connection of multi-disk clutch 7 with the disconnection of multi-disk brake 8. Furthermore, the disconnection of multi-disk clutch 7 and connection of multi-disk brake 8 are coupled. Switching mechanism 9 includes an independent air cylinder 60, an annular member 70, brake-side annular member 71, a plurality of bolts 72, a thrust bearing 73, a plurality of brake springs 74, and a compression spring 75.

Air cylinder 60 comprises a cylinder body, having second case 46 and head-side case member 61 which is joined by bolts to the rear part of second case 46. A piston member 62 movably fits inside second case 46 via annular seal 69. An air chamber 64 is formed between piston member 62 and head-side case member 61. An air supply port 65, which supplies compressed air to air chamber 46, is formed in head-side case member 61.

A ring-shaped output part 63 is formed unitarily and extends leftward from the part of piston member 62 that is opposite multi-disk clutch 7. Output part 63 delivers the pushing force of piston member 62 to clutch plate 50 of multi-disk clutch 7. A plurality of oil passages 63a for oil circulation are formed radially on output part 63 at certain intervals in the circumferential direction. A protuberance 62a, which protrudes towards the left side, is formed at the center portion of piston member 62. Compression spring 75, which is for elastic impelling of piston member 62 to the left, is provided in the recess formed by protuberance 62a and in recess 61a, which is formed at the left part at the center of head side case member 61.

Annular member 70 and piston member 62 are opposite each other with a small gap therebetween. Annular member 70 is joined by a spline to fit inside the right end portion of rotation input member 5. Annular member 70 can move in the right-left direction and rotates as a unit with rotation shaft 4. A hole 70a, which has a larger diameter than protuberance 62a of piston member 62, and an annular recess 70b, which is positioned near hole 70a, are formed at the center of annular member 70. Thrust bearing 73 is provided between annular recess part 70b and a holding part 62b on the outer circumference side of protuberance 62a of piston member 62. Holding part 62b of piston member 62, which is elastically impelled towards the left by compression spring 75, is always pressed into contact with thrust bearing 73.

On the right side of stationary plate member 16, brake-side annular member 71 is close to and is opposite brake disk 56 of multi-disk brake 8. Hole 71a is formed in the center portion of brake side annular member 71. The cone-shaped left end portion of rotation input member 5 is inserted into hole 71a. Brake side annular member 71 is unitarily joined with annular member 70 by nuts and the plurality of bolts 72 which pass through the plurality of bolt holes 43 of rotation input member 5.

A plurality of brake springs 74, which brake (connect) multi-disk brake 8, are each housed in the plurality of spring housing holes 44 of rotation input member 5. In other words, annular member 70 is elastically impelled towards piston member 62 (towards the right) by these brake springs 74. Brake side annular member 71 is elastically impelled towards the right via this annular member 70 and the plurality of bolts 72.

Clutch-brake device 1 is a wet clutch-brake device. Because of this, an oil housing part 80. housing oil for cooling and lubricating, is provided in the area surrounded by fly wheel 2, stationary member 3, case member 6, piston member 62, and the like. Plurality of oil passages 63a, in the radial direction, are for oil circulation, are formed at certain intervals in the circumferential direction on output part 63 of piston member 62.

The action and advantages of the above clutch-brake device 1 will be described.

The driving force of the main motor is inputted into fly wheel 2 via an endless belt (not shown), and fly wheel 2 is rotationally driven. Referring now to FIG. 2, before molding the work by press body 13, multi-disk clutch 7 is switched to the connected state and multi-disk brake 8 is switched to the disconnected state by switching mechanism 9 and the air supply unit, which controls the compressed air supplied to air cylinder 60. When compressed air is supplied to air cylinder 60, piston member 62 is driven to the left. The pushing force of piston member 62 is directly delivered to clutch plate 50 via output part 63. In this manner, multi-disk clutch 7 is pushed and switched to the connected state. In parallel with this, brake-side annular member 71 is pushed and moved in the direction away (to the left) from multi-disk brake 8 via thrust bearing 73, annular member 70, and plurality of bolts 72. Multi-disk brake 8 is switched to the disconnected state. In this state, the driving force inputted into fly wheel 2 is delivered to the crank shaft of press body 13 via case member 2, multi-disk clutch 7, rotation input member 5, rotation shaft 4, gears 34 and 33, and the like.

In the next instant, referring now to FIG. 3, when stopping the rotation of the crank shaft of press body 13 for the removal of the work or for supply of the work material or the like, multi-disk clutch 7 is switched to the disconnected state and multi-disk brake 8 is switched to the connected state by the air. supply unit and switching mechanism 9. In other words, when the compressed air of air cylinder 60 is released, the elastic impelling force of the plurality of brake springs 74 is delivered to brake plate 55 via annular member 70, plurality of bolt members 72, and brake-side annular member 71. As a result, multi-disk brake 8 is switched to the connected state, and parallel to this, multi-disk clutch 7 is switched to the disconnected state. Rotation shaft 4 is braked and rotation is stopped.

According to clutch-brake device 1, the pushing force of piston member 62 is directly delivered from output part 63, which is formed on piston member 62 of air cylinder 60 which rotates as a unit with fly wheel 2, to clutch plate 50, which rotates as a unit with case member 6. When delivering the pushing force, because there is no relative rotation between clutch plate 50 and output part 63, there is no slippage. As a result, abrasion of piston member 62 and clutch plate 50 is prevented, and durability is greatly improved. Because the construction has output part 63 directly pushing clutch plate 50, the distance from piston member 62 to clutch plate 50 can be made small, and multi-disk clutch 6 can be made smaller in the axial direction, thereby reducing manufacturing costs.

Because there are provided annular member 70, brake-side annular member 71, plurality of bolts 72 which join brake-side annular member 71 to annular member 70, and thrust bearing 73 between piston member 62 and annular member 70, in parallel with the switching of multi-disk clutch 7 to the connected state, multi-disk brake 8 can be switched to the disconnected state.

Even when there is a rotation speed difference between annular member 70 and piston member 62, this rotation speed difference can be absorbed by thrust bearing 73. As a result, the abrasion of annular member 70 and piston member 62 is prevented, and durability can be heightened.

Because there is provided a plurality of brake springs 74 which impel multi-disk brake 8 to the connected state (braking state), multi-disk brake 8 can be connected and multi-disk clutch 7 can be disconnected by the elastic impelling force of the plurality of brake springs 74.

When switching multi-disk brake 8 to the connected state, brake-side annular member 71 contacts brake disk 56, but brake side annular member 71 and brake disk 56 rotate as a unit, and a rotation speed difference does not arise between the two, and slippage does not result. As a result, their abrasion is prevented, and durability is improved.

Because there is provided compression spring 75 which elastically impels piston member 62 in the direction of annular member 70 (to the left), piston member 62 is always being pushed against thrust bearing 73. Looseness in thrust bearing 73 and piston member 62 is prevented.

In rotation shaft 4, because there is provided a support part which, via bearing 31, rotationally supports a part on the opposite side (left side) as stationary member 5 with respect to gear member 34, rotation shaft 4 can be supported on both sides of gear member 34 by the two rows of tapered roller bearings 30 on the stationary member 5 side and by bearing 31. In this mariner, the sagging of rotation 4 is suppressed, and a smooth engagement of gear member 34 with gear 33, which is affixed to the crank shaft, can be maintained.

A plurality of bolts 72 pass through each of a plurality of bolt holes 43 of rotation input member 5. A plurality of brake springs 74 are each housed in spring housing holes 44 of rotation input member 5. Compression spring 75 is placed between piston member 62 and head-side case member 61. As a result, these members 72, 74, and 75 can be built in without interfering with other members, and this is advantageous in allowing for miniaturization of the clutch-brake device.

Oil is housed in oil housing part 80 formed by the part surrounded by fly wheel 2, stationary member 3, case member 6, and piston member 62 of fluid pressure cylinder 60, and the like. A plurality of oil passages 63a are formed at certain intervals in the circumferential direction on output part 63 of piston member 62. Because of these, multi-disk clutch 7 and multi-disk brake 8 can be effectively cooled. The circulation of oil is facilitated by the plurality of oil passages 63a.

Next, some of the partial modifications for the above embodiment are described.

1) Instead of air cylinder 60, an actuator of a hydraulic cylinder or the like can be used.
2) On stationary member 3, an oil passage, which connects to oil housing part 80 in between stationary member 3 and inserted shaft part 4d of rotation shaft 4, can be formed. An oil gauge is connected via this oil passage or the like. From this oil gauge. the level of the oil housed inside oil housing part 80 can be detected. The level of the oil is set to be at least the level at which multi-disk clutch 7 and multi-disk brake 8 are immersed.
3) Instead of bearing 31, there can be provided a support part which, via a bearing, rotationally supports a part of rotation shaft 4 on the stationary member 3 side (left side) with respect to gear member 34. In this situation, a space for placing parts and the like of the mechanical press can be ensured on the gear member 34 side of clutch-brake device 1. This is advantageous for the placement of clutch-brake device 1.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A clutch-brake device provided on a driving force delivery system which delivers a driving force inputted into a fly wheel to a gear, comprising:
   a stationary member rotationally supporting said fly wheel;
   a rotation shaft, having at least one part rotationally supported by said stationary member, delivering said driving force to said gear;
   a multi-disk clutch being between a case member affixed to said fly wheel and a rotation input part of said rotation shaft;
   a multi-disk brake being between said stationary member and said rotation input part of said rotation shaft;
   a fluid pressure cylinder, rotating as a unit with said fly wheel, switching said multi-disk clutch and said multi-disk brake;
   a piston member in said fluid pressure cylinder;
   an output part, on said piston member of said fluid pressure cylinder, effective for transferring a pushing force of said piston member to a clutch plate which rotates as a unit with said case member, whereby relative rotation does not exist between said output part and said clutch plate, and frictional wear therebetween does not occur; and
   said piston member extending fully across said fluid pressure cylinder to develop said pushing force.

2. The clutch-brake device according to claim 1, further comprising:
   an annular member, which is opposite, with a small gap therebetween, said piston member of said fluid pressure cylinder;
   said annular member being capable of moving in an axial direction, rotating as a unit with said rotation shaft;
   a brake-side annular member being close to and opposite said multi-disk brake;
   a plurality of bolts joining said brake-side annular member to said annular member; and
   a thrust bearing being provided between said piston member and said annular member.

3. The clutch-brake device according to claim 2, further comprising:
   a plurality of brake springs elastically impelling said brake-side annular member and said annular member in a direction of said piston member; and
   said plurality of brake springs bringing said multi-disk brake to a braking state.

4. The clutch-brake device according to claim 3, wherein:
   said brake-side annular member is near and opposite a brake disk which rotates as a unit with said rotation input part of said rotation shaft.

5. The clutch-brake device according to claim 4, further comprising:

a plurality of spring housing parts, housing a plurality of brake springs, in the interior of said rotation input part.

6. The clutch-brake device according to claim 5, further comprising:

a depression centered in a side of said piston member facing a head-side case member;

a compression spring biased in said depression urging apart said head-side case member and said piston member of said fluid pressure cylinder.

7. A clutch-brake device according to claim 2, further comprising:

a central depression centered in said piston member;

a compression spring biased in said central depression elastically impelling said piston member toward said annular member.

8. The clutch-brake device according to claim 1, further comprising:

a gear member, affixed to said rotation shaft, engaging said gear;

a support part rotationally supporting a part of said rotation shaft that is on the opposite side of said stationary member with respect to said gear member.

9. The clutch-brake device according to claim 2, wherein said rotation input part further comprises a rotation input member joined by a spline to said rotation shaft, and means for preventing movement of said rotation member in the axial direction.

10. The clutch-brake device according to claim 9, wherein said plurality of bolts passes through said rotation input part.

11. A clutch-brake device on a driving force delivery system which delivers a driving force inputted into a fly wheel to a gear, comprising:

a stationary member rotationally supporting said fly wheel;

a rotation shaft, having at least one part rotationally supported by said stationary member, delivering said driving force to said gear;

a multi-disk clutch being between a case member affixed to said fly wheel and a rotation input part of said rotation shaft;

a multi-disk brake being between said stationary member and said rotation input part of said rotation shaft;

a fluid pressure cylinder, rotating as a unit with said fly wheel, switching said multi-disk clutch and said multi-disk brake;

an output part, on a piston member of said fluid pressure cylinder, transferring a pushing force of said piston member to a clutch plate which rotates as a unit with said case member;

an oil housing part, housing oil for said multi-disk clutch and said multi-disk brake, located in an area surrounded by said stationary member, said fly wheel, said case member, and said piston member of said fluid pressure cylinder; and a plurality of oil passages, for oil circulation, arranged in the radial direction at certain intervals in the circumferential direction on said ring-shaped outer part of said piston member.

* * * * *